US006484072B1

(12) United States Patent
Anderson et al.

(10) Patent No.: US 6,484,072 B1
(45) Date of Patent: Nov. 19, 2002

(54) EMBEDDED TERRAIN AWARENESS WARNING SYSTEM FOR AIRCRAFT

(75) Inventors: Thomas E. Anderson, California, MD (US); Thomas J. Hanrahan, Lexington Park, MD (US); Charles W. Shaffer, Leonardtown, MD (US); John William Shultz, Solomons, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/965,251

(22) Filed: Sep. 28, 2001

(51) Int. Cl.[7] ................................................ G06F 17/00
(52) U.S. Cl. ........................ 701/9; 701/16; 244/158 R; 340/945
(58) Field of Search ................................. 701/1, 3, 4, 6, 701/9, 13, 14, 16; 244/75 R, 158 R; 340/945

(56) References Cited

U.S. PATENT DOCUMENTS

| | | |
|---|---|---|
| 4,433,323 A | 2/1984 | Grove |
| 4,495,483 A | 1/1985 | Bateman et al. |
| 4,567,483 A | 1/1986 | Bateman et al. |
| 4,646,244 A | 2/1987 | Bateman et al. |
| 4,675,823 A | 6/1987 | Noland |
| 4,684,948 A | 8/1987 | Bateman |
| 4,725,811 A | 2/1988 | Muller et al. |
| 4,849,756 A | 7/1989 | Bateman |
| 4,857,923 A | 8/1989 | Bateman |
| 4,891,642 A | 1/1990 | Muller |
| 4,905,000 A | 2/1990 | Bateman |
| 4,914,436 A | 4/1990 | Bateman et al. |
| 4,947,164 A | 8/1990 | Bateman |
| 5,059,964 A | 10/1991 | Bateman |
| 5,136,518 A | 8/1992 | Glover |
| 5,153,588 A | 10/1992 | Muller |
| 5,166,682 A | 11/1992 | Bateman |
| 5,196,847 A | 3/1993 | Bateman |
| 5,839,080 A | 11/1998 | Muller et al. |
| 6,092,009 A | 6/2000 | Glover |
| 6,088,634 A * | 7/2000 | Muller et al. .................. 701/9 |
| 6,122,570 A | 9/2000 | Muller et al. |
| 6,138,060 A | 10/2000 | Conner et al. |

* cited by examiner

*Primary Examiner*—Gertrude Arthur
(74) *Attorney, Agent, or Firm*—Mark O. Glut

(57) ABSTRACT

An embedded terrain awareness warning system for aircraft being flown by a pilot includes a signal processing component, a protection component and a pilot vehicle interface. A method for providing an embedded terrain awareness warning system for aircraft being flown by a pilot includes providing a signal processing component, a protection component and a pilot vehicle interface. The signal processing component communicates with three-dimensional digital terrain elevation data and is able to take input data from aircraft sensors, aircraft computers or navigation systems and determine aircraft position and velocity. The protection component is in communication with the signal processing unit such that the protection component is able to determine if a potential controlled flight into terrain exists and is able to predict a recovery flight path to avoid terrain. The pilot vehicle interface communicates with the protection component such that the pilot vehicle interface can issue a warning to the pilot of the aircraft of impending flight into terrain, and issue a directive solution to prevent the impending flight into terrain.

21 Claims, 4 Drawing Sheets

EMBEDDED TERRAIN AWARENESS WARNING SYSTEM FOR AIRCRAFT

The material on the compact discs and the computer program listing appendix is hereby incorporated-by-reference.

BACKGROUND

The present invention relates to an embedded terrain awareness warning system for aircraft. More specifically, but without limitation, the present invention relates to an embedded terrain awareness warning system or terrain advisory system that provides visual and aural warnings of impending controlled flight into terrain, to pilots of aircraft so that recovery may be initiated.

Existing terrain advisory systems, like the Ground Proximity Warning System ("GPWS"), compute the altitude required for recovery based upon current flight conditions. In some GPWS, the altitude is compared to the height above the terrain (measured by a radar altimeter) and a warning is issued to the pilot when insufficient altitude remains for avoiding the terrain. This is basically a one-dimensional solution in altitude only. This type of GPWS is sometimes referred to as a "look down" system because the primary sensor of the GPWS is the radar altimeter. An altimeter is typically defined, but without limitation, as a flight instrument that indicates altitude above a reference level, as above the sea or ground. The radar altimeter can typically only measure the altitude directly below the aircraft, not what is in front of the aircraft. Therefore, this type of GPWS cannot protect the pilot from flight into rising terrain (i.e., mountains). In addition, the radar altimeter is not functional when the aircraft is inverted, at steep dive angles, or at high altitudes. These types of aircraft maneuvers are common when flying tactical aircraft (a tactical aircraft is typically defined, but without limitation, as an aircraft designed for, or used in, fighting operations against a hostile force either in the air or on the surface), especially in combat and military training situations. Therefore, this type of GPWS would not be useful aboard a tactical aircraft.

For a warning system to be accepted by the pilot community it must not issue any "nuisance warnings"—that is, unnecessary warnings that occur which hinder or distract the pilot when executing authorized aircraft maneuvers. Existing GPWS met the threshold for "nuisance warnings," however; current systems are still nuisance prone in some areas because of the system's inability to accurately project terrain ahead of the aircraft.

Another approach to terrain advisory systems utilizes a geographic input. In this approach representative data is stored for various geographic locations. Certain terrain advisory systems store computer representations of terrain. Typically, these systems do not store all of the irregularities of the terrain and obstacles. Instead, some current systems approximate the terrain and obstacles by a series of standard shapes. These standard shapes include simple geometric shapes such as cones, truncated cones, connected cones and other shapes. This type of system only approximates the terrain and often does not give an accurate reading or warning to the pilot, and often times gives incorrect nuisance warnings, especially at supersonic speeds (greater than the speed of sound) and in combat situations.

Certain terrain advisory systems do not provide recovery solutions or inform the pilot the type of action required to avoid terrain. This type of system requires the pilot to determine the action needed, which may take time, after which it may be too late to initiate recovery.

For the foregoing reasons, there is a need for an embedded terrain awareness warning system for aircraft. Information relevant to attempts to address these problems can be found in U.S. Pat. No. 4,433,323, 4,495,483, 4,567,483, 4,646,244, 4,684,948, 4,675,823, 4,725,811, 4,849,756, 4,857,923, 4,891,642, 4,905,000, 4,914,436, 4,947,164, 5,059,964, 5,136,518, 5,153,588, 5,166,682, 5,196,847, 5,839,080, 6,088,634, 6,092,009, 6,122,570, and 6,138,060. (None of these patents are admitted to be prior art with respect to the present invention.) However, each of these references suffers from one of the above listed disadvantages or from an unlisted disadvantage.

SUMMARY

The present invention is directed to an embedded terrain awareness warning system for aircraft that satisfies the needs listed above and below.

It is an object of the present invention to provide an embedded terrain awareness warning system for aircraft that overcomes many of the disadvantages of currently used warning and terrain advisory systems. An embedded terrain awareness warning system having features of the present invention comprises of a signal processing component, a protection component and a pilot vehicle interface. The signal processing component is in communication with three-dimensional digital terrain elevation data; the three-dimensional digital terrain elevation data contains digital terrain. The signal processing component is able to take input data from aircraft sensors and determine aircraft velocity and aircraft position on the three-dimensional digital terrain elevation data. The protection component is in communication with the signal processing component such that the protection component is able to predict a flight path of the aircraft and overlay the flight path on the digital terrain elevation data and is able to determine if a potential controlled flight into terrain situation exists. The protection component is further able to determine a recovery flight path to avoid terrain. The pilot vehicle interface communicates with the protection component such that the pilot vehicle interface can issue to the pilot of the aircraft a warning if there exists a potential impending flight into terrain, and issue to the pilot directions for a recovery flight path solution to prevent flight into terrain. The directions for a recovery flight path solution is based on the recovery flight path to avoid terrain.

It is an object of the present invention to provide an embedded terrain awareness warning system for aircraft that predicts recovery in three dimensions.

It is another object of the present invention to provide an embedded terrain awareness warning system for aircraft that warns the pilot of flight into rising terrain.

It is also an object of the present invention to provide an embedded terrain awareness warning system for aircraft that is functional when the aircraft is inverted, at steep dive angles, at high altitudes, or during emission control conditions (radar altimeter turned off for threat avoidance).

It is also an object of the invention to provide an embedded terrain awareness warning system for aircraft that can be effectively used aboard a tactical aircraft.

It is also an object of the present invention to provide an embedded terrain awareness warning system for aircraft that does not over-predict the recovery capabilities, thus significantly reducing nuisance warnings.

It is an object of the present invention to provide a robust terrain advisory system that predicts flight in all types of terrain and all flight phases and issues warnings to the aircrew in sufficient time to successfully recover the aircraft from flight into terrain. It is another object of this invention to minimize nuisance warnings while providing this protection.

It is an object of the present invention to provide an embedded terrain awareness warning system for aircraft that integrates multiple sensor data to reduce errors and eliminate false or nuisance warnings. False warnings are, but without limitation, those warnings that are caused by erroneous data while the aircraft is not in a potential controlled flight into terrain condition. Controlled flight into terrain is typically defined, but without limitation, as a fully functioning aircraft and pilot crashing into terrain or water. This type of incident usually results when a pilot loses situational awareness or becomes preoccupied with a task.

It is also an object of the present invention to provide an embedded terrain awareness warning system for aircraft that stores all of the irregularities of terrain and obstacles.

It is an object of the present invention to provide an embedded terrain awareness warning system for aircraft, which provides visual and aural (pertaining to the sense of hearing) warnings of impending controlled flight into terrain to pilots of aircraft so that recovery can be initiated.

It is an object of the present invention to provide an embedded terrain awareness warning system for aircraft, which provides a recovery arrow on the head-up display or primary flight instrument of the aircraft and directive voice commands warning the pilot of impending controlled flight into terrain so that recovery can be initiated.

It is another object of the present invention to provide an embedded terrain awareness warning system for aircraft, which provides the pilot of the aircraft a warning of impending controlled flight into terrain and informs the pilot the type of action required to avoid the terrain.

It is an object of the present invention to provide an embedded terrain awareness warning system for aircraft that accurately models the aircraft responses, thereby, increasing the likelihood that a warning will be issued in sufficient time for successful recovery.

DRAWINGS

These and other features, aspects and advantages of the present invention will become better understood with reference to the following description and appended claims, and accompanying drawings wherein:

Figure 3:
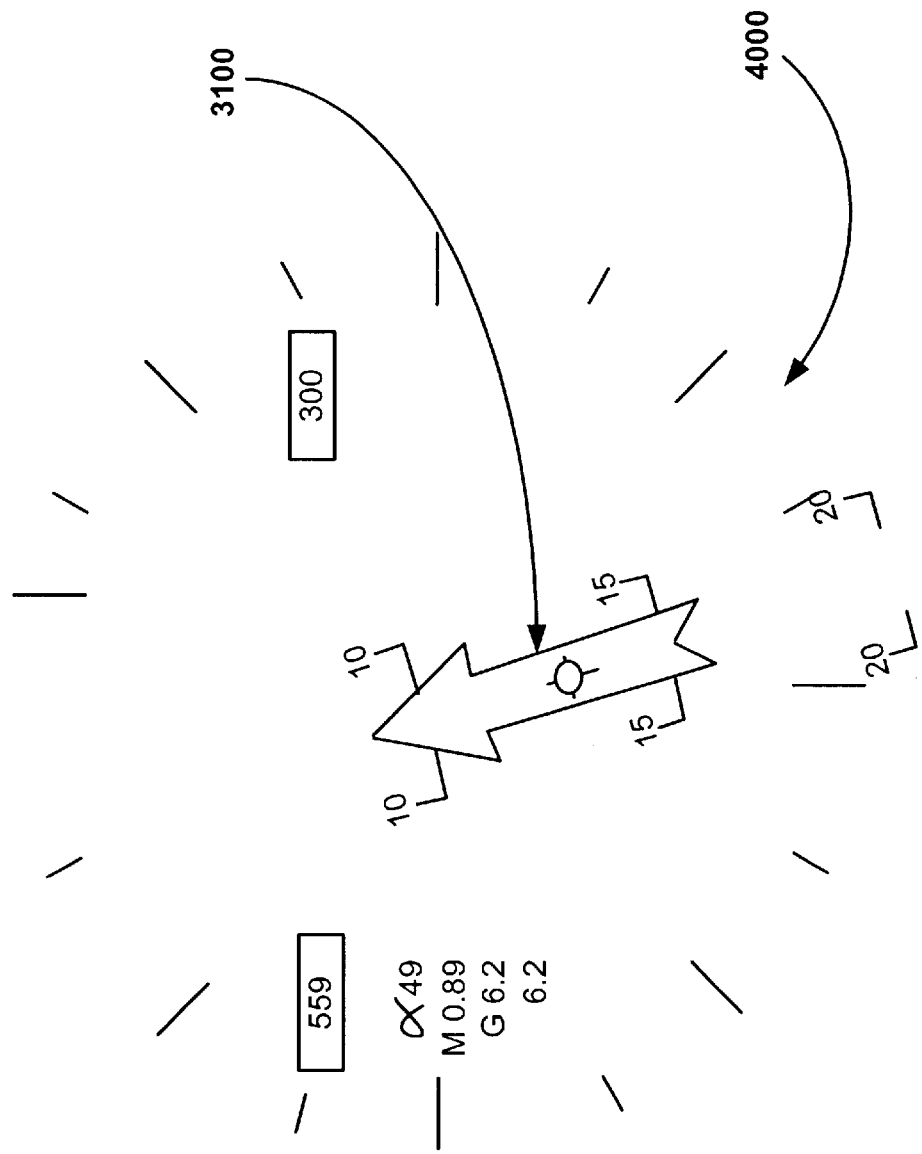
Figure 4:
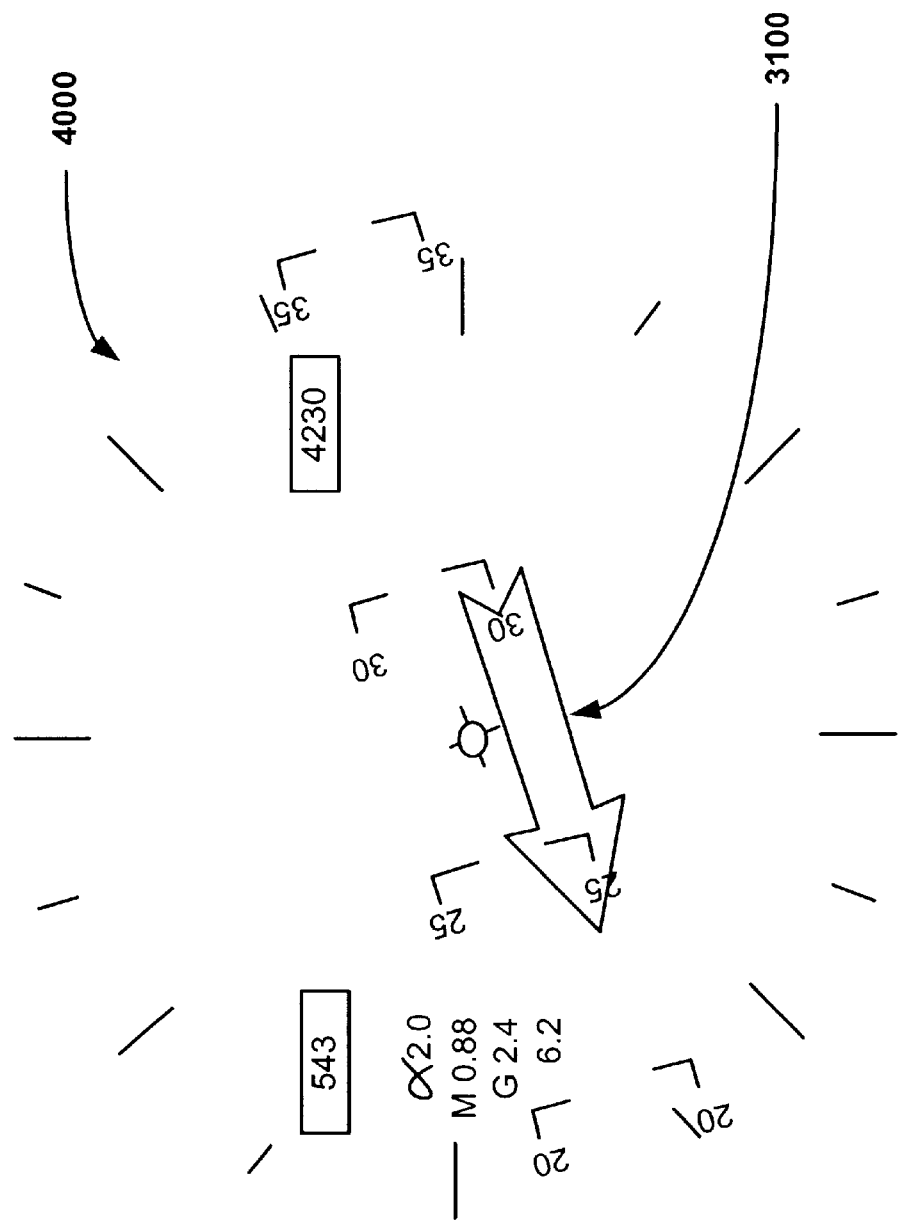

FIG. 3 is a representation of the recovery arrow on the head-up display given to the pilot when a warning condition is set, specifically the figure shows how the arrow would be presented in a near wings-level condition (a pull-up is required); and, FIG. 4 is a representation of the recovery arrow on the head-up display given to the pilot when a warning condition is set, specifically the figure shows that the aircraft needs to fly to the left in order to avoid collision with the terrain.

DESCRIPTION

Figure 1:
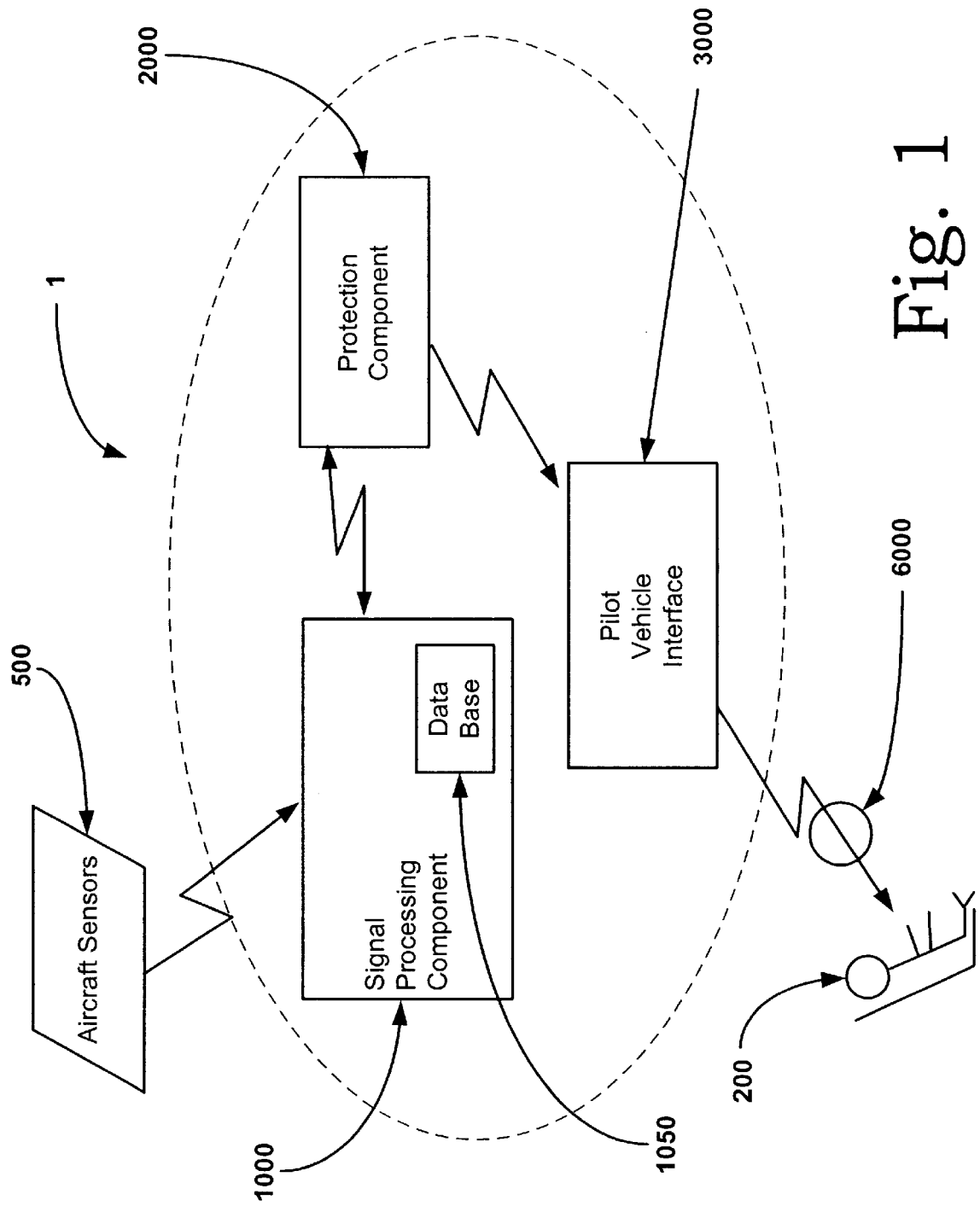
FIG. 1 is a functional block diagram of the embedded terrain awareness warning system for aircraft.

The preferred embodiment of the present invention is illustrated by way of example below and in FIGS. 1, 2, 3, and 4. As seen in FIG. 1, the embedded terrain awareness warning system for aircraft 1 includes a signal processing component 1000, a protection component 2000 and a pilot vehicle interface 3000. Although the system according to the invention is illustrated as a series of functional blocks for purposes of clarity, it is to be understood that the actual implementation of the system may be other than specifically shown in FIG. 1, with various digital and analog implementations being possible.

In the discussion of the present invention, the system will be discussed in an aircraft environment, specifically a tactical aircraft environment, however, the system can also be utilized for other vehicles that must navigate around terrain or known obstacles, such as, for example, but without limitation, submarines, ships, land vehicles, or even space crafts.

The signal processing component 1000 may contain three-dimensional digital terrain elevation data 50 (when available). Digital terrain elevation data 50 is defined, but without limitation, as stored data which describes or illustrates the topography and/or a detailed mapping or description of the features of a particular specific area or region, specifically the area or region where the aircraft 100 is flying. Digital terrain elevation data 50 is, but without limitation, a digital representation of ground topography that is referenced by the latitude and longitude for that particular elevation. The digital terrain elevation data 50 may be stored in a digital terrain elevation database 1050.

The signal processing component 1000 may take input data from aircraft sensors 500 and the digital terrain elevation database 1050 and determine aircraft position and velocity by fusing the data. The use of multiple aircraft sensors 500 allows signal processing to accurately determine position and velocity even when some sensors are unavailable. This also allows rejection of spurious data. Examples of aircraft sensors 500 include, but without limitation, a radar altimeter, a vertical speed sensor, a vertical gyro, a vertical velocity sensor, a barometric altitude sensor, or any type of sensor or system that gathers, monitors, reports, conveys or collects any type of aircraft data or aircraft parameters. Input data can also be obtained from individual instruments such as a discrete circuit element indicating position of the flaps or other parts of the aircraft, or from a digital data bus in certain newer aircraft. The signal processing component 1000 may also obtain input data from an air data computer (the air data computer typically measures the speed of the aircraft 100 relative to the surrounding air mass and atmospheric conditions indicating altitude), a navigation system or a flight management system, which may be present on the aircraft 100. The signal processing component 1000 can also obtain inputs from the Inertial Navigation System (this system measures linear and angular accelerations and computes the linear and angular positions and velocities of the aircraft relative to the earth), the Global Positioning System (this system measures position and velocity from signals received from a constellation of satellites in circular orbit around the earth), and numerous aircraft specific inputs (i.e., but without limitation, landing gear position, weight on wheels, gross weight, and data validity indicators).

The protection component 2000 communicates with the signal processing component 1000 such that the protection component 2000 is able to determine if a potential controlled flight into terrain situation exists. The protection component 2000 is also able to predict the flight path of the aircraft 100 and overlay the flight path on the digital terrain elevation data 50. The protection component 2000 is further able to determine a recovery flight path to avoid the terrain.

Figure 2:
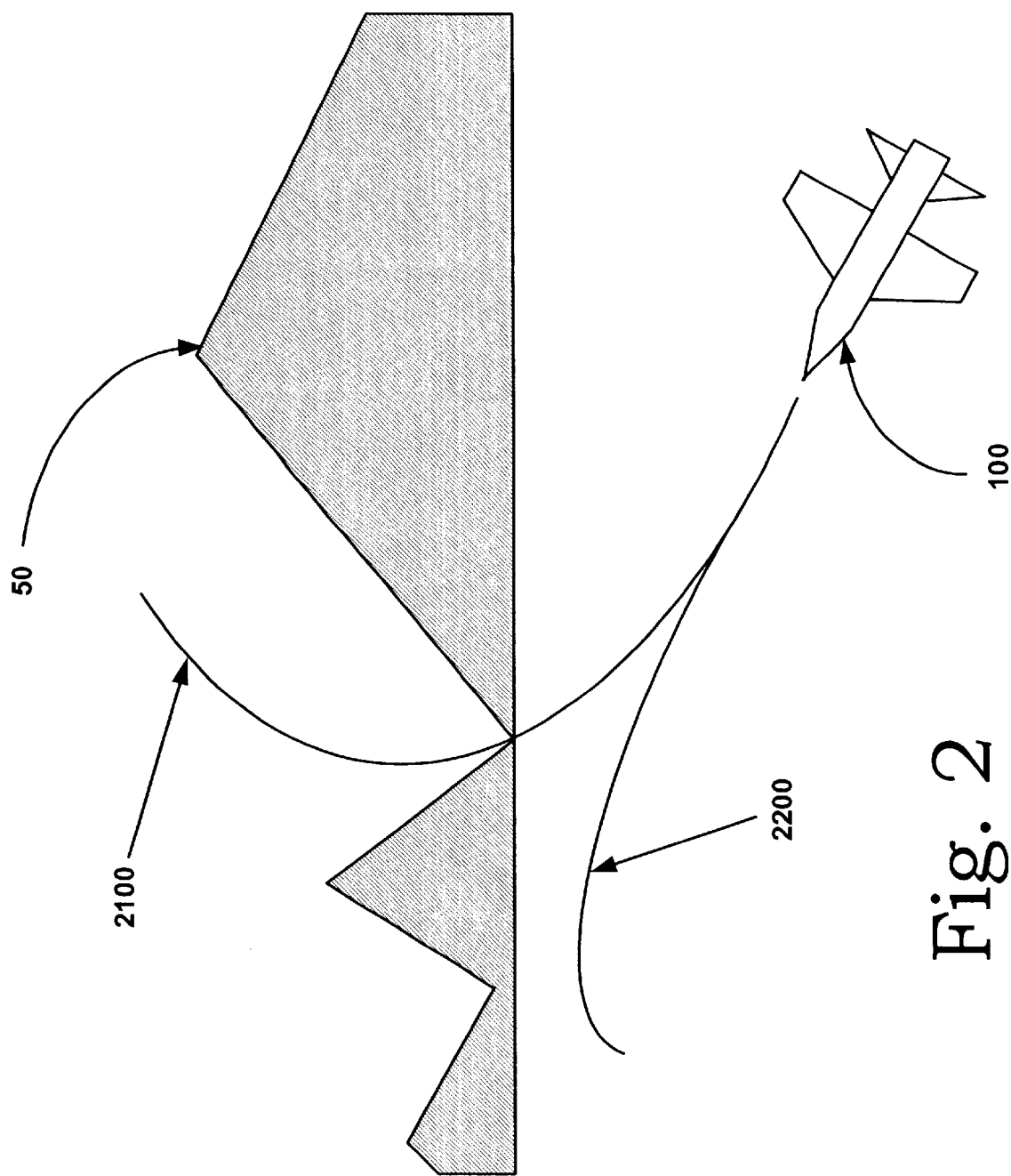
FIG. 2 is a representation of the predicted recovery trajectories used to determine when a potential controlled flight into terrain exists.

The protection component 2000 receives aircraft state information from the signal processing component 1000 such that the protection component 2000 is able to determine if a potential controlled flight into terrain scenario exists. The determination is accomplished by the protection component 2000 predicting the flight path of the aircraft 100 and overlaying it onto the digital terrain elevation data 50. As seen in FIG. 2, in the preferred embodiment, the protection component 2000 computes or predicts two flight paths, a vertical recovery trajectory 2100 and an oblique recovery trajectory 2200 and overlays both on the digital terrain elevation data 50. When both trajectories intersect the digital terrain for a number of consecutive iterations (preferably at least four), a warning condition is set. The warning condition is cleared when either of the recovery trajectories no longer intersects the digital terrain elevation data 50 for a number of consecutive iterations (again preferably at least four). When the vertical recovery trajectory 2100 intersects the digital terrain, terrain on either side of, and perpendicular to, the vertical recovery trajectory 2100 at the potential intersection point is checked for trajectory intercept as confirmation. This eliminates nuisance warnings due to uncertainties in position, actual recovery trajectory, and digital terrain.

The signal processing component 1000 may compute a height above terrain ("HAT") for use by the protection component 2000. The signal processing component 1000 may send an aircraft mean sea level ("MSL") height to the protection component 2000, equal to the HAT plus the elevation acquired from the digital terrain database 50, so that the trajectory can be matched with the terrain. However, all of the calculations within the signal processing component 1000 are performed in terms of height above local terrain, and so are described that way herein. The HAT may come from multiple data sources. One data source for the HAT may be the difference between the aircraft MSL altitude and the elevation of the earth derived from the digital terrain database 50. The MSL altitude may come from the Global Positioning System, or from a blend of the inertial and barometric sensors. The signal processing component 1000 may use the altitude error estimate produced by the Global Positioning System to choose which altitude source to use. It may also use the historically documented performance characteristics of the barometric accuracies to determine when not to believe this source. An error estimate is also determined for the digital terrain database height. This may be based on the variation in terrain detected in the area where the aircraft 100 is flying. The signal processing component 1000 calculates an estimated HAT error from these sources by combining the MSL estimated errors with the terrain height errors. The signal processing component 1000 also calculates a HAT from the radar altimeter. The altimeter reading may be tested for believability based on angular and altitude limitations, sudden changes, and comparisons with other sources in order to discard potentially spurious data. The two HAT measurements may be compared over time to determine any long-term biases between the two. The biases and the known error characteristics of all altitude sources may be used to determine the proper weighting of each source in determining the best HAT. This "best" HAT may be adjusted by a noise buffer to prevent nuisance cues. The noise buffer may be determined by the variation seen in the data, and by the amount of agreement or disagreement between the various sources. This noise buffer is added to the "best" HAT to determine the HAT to send to the protection component 2000 as the starting point for the predicted flight path(s) or aircraft recovery trajectory (ies).

When digital terrain elevation data 50 is unavailable, the signal processing component 1000 calculates aircraft state information based solely on the aircraft sensors 500 and/or on-board computers, and sends the HAT (without adjusting for the local terrain elevation) to the protection component 2000. The protection component 2000 computes the altitude required to recover the aircraft 100 from level or downsloping terrain (as computed in the signal processing component 1000).

As seen in FIG. 1, the pilot vehicle interface 3000 communicates with the protection component 2000 such that the pilot vehicle interface 3000 can issue a warning to the pilot 200 of the aircraft 100 of potential impending flight into terrain. This warning is issued when a warning condition is set by the protection component 2000. In the case of an unmanned vehicle the warning can be issued to the primary controlling person, computer or apparatus.

As stated above, the embedded terrain awareness warning system for aircraft 1, specifically the protection component 2000, predicts two flight paths: the vertical recovery trajectory 2100 and the oblique recovery trajectory 2200. The vertical recovery trajectory 2100 assumes that the aircraft 100 will be rolled (any movement of an aircraft about its longitudinal axis) to wings-level followed by a pull to the targeted normal acceleration until the recovery is complete (nominally 5 g when above corner speed, corner speed is typically defined as the airspeed at which the structural limit of normal acceleration is achievable). The oblique recovery trajectory 2200 assumes that the current bank angle will be maintained during the recovery. A bank angle is, but without limitation, an aircraft's angle of roll. An angle of roll is the acute angle between the lateral axis (the side to side axis) of the aircraft 100 and the horizontal. The use of the two flight paths reduces the probability that a warning will be a nuisance since both paths or trajectories must intersect the digital terrain before a warning is sent to the pilot 200. FIG. 2 shows a representation of the flight paths (or predicted recovery trajectories) used to determine when a potential controlled flight into terrain exists.

The flight paths (the vertical recovery trajectory 2100 and the oblique recovery trajectory 2200) may be computed based upon average accelerations using the average sines and cosines of the attitude angles. An attitude angle may be defined, but without limitation, as the angle of the aircraft presented at a given moment, as determined by the aircraft's inclination about its three axes, as to pitch, roll, or yaw. The flight paths may be sliced into numerous segments, which are compared against the digital terrain elevation data 50 for intersection.

When a warning condition is computed (both trajectories intersect the digital terrain), the pilot 200 may receive a directive aural cue via a headset and an arrow on the head-up display 4000 (or other primary flight instrument) that indicates the direction for recovery. A head-up display 4000 is typically defined, but without limitation, as a display of typical aircraft conditions displayed on the canopy or windscreen so that the pilot may read them without having to look down at the cockpit area or control area. The directive aural cues, but without limitation, may include "Pull-Up . . . Pull-Up," "Roll-Left . . . Roll-Left," "Roll-Right . . . Roll-Right," "Power . . . Power," and "Check Gear." The directive nature of the cues requires little thought, thus minimizing the pilot response delay. The combination of directive cues and arrows on the head-up display 4000 provides the pilot 200 with unambiguous information. This unambiguous information allows for timely and appropriate responses that lead to terrain avoidance. For example, but without limitation, FIG. 3 depicts an example of the head-up display 4000 with a recovery arrow 3100 pointing substantially in the upward direction. The recovery arrow 3100 pointing substantially up indicates a pull-up is required to prevent flight into terrain. FIG. 4 depicts an example of the head-up display 4000 with a recovery arrow 3100 pointing substantially left. The recovery arrow 3100 pointing substantially left indicates a turn or roll to the left is required to prevent flight into terrain.

The pilot vehicle interface 3000 communicates with the protection component 2000 to issue warnings to the pilot 200 of potential impending flight into terrain. The directive voice cue annunciated is dependent on the aircraft state at the warning and indicates what the proper initial response is to avoid hitting the terrain (i.e., "Roll-Left," "Roll-Right," "Power," "Pull-Up," or "Check Gear"). These directive voice cues are presented along with the recovery arrow 3100 on the head-up display 4000. The directive voice cue can change while the recovery maneuver is underway. That is, a "Roll-Right" may be followed by a "Pull-Up" when the aircraft is near wings-level. Directive voice cues are repeated at prescribed intervals until the warning condition no longer exists.

The pilot vehicle interface 3000 may inhibit warnings from being issued to the pilot 200 even though the protection component 2000 has set a warning condition. Inhibiting warnings means that no directive voice cue or recovery arrow is issued. This may occur when data uncertainty exists or in conditions where the warning would most likely be considered a nuisance.

The directive voice cues, although not necessarily resident with the embedded terrain awareness warning system for aircraft 1, may be an integral part of the system. The directive voice cues may reside in a voice generating system 6000 aboard the aircraft 100. The voice generating system 6000 communicates with the pilot vehicle interface 3000 to give the proper aural cue to the pilot 200. However, the voice inflection and volume of these directive voice cues must convey the urgency of the situation. It is preferred that the directive voice cues are twice as loud as normal cockpit communication and annunciations.

In the preferred embodiment of the invention, each predicted flight path may be broken down into several components or phases that make up the vertical recovery trajectory 2100 and the oblique recovery trajectory 2200. There are typically five components or phases, which include the pilot response phase, the roll response phase, the G-delay phase, the G-onset phase, and the dive recovery phase.

The pilot response phase is the time necessary for the pilot to respond to the visual and aural cues. The pilot response phase may also be defined as the time from the visual and aural cues to when the pilot initiates the recovery by modulating the power or deflecting the control stick. During this phase, which lasts about 1.3 seconds, changes in aircraft flight condition are predicted based upon the current aircraft velocities and accelerations, and assumptions of the pilot's intentions. During this phase, the average accelerations acting on the aircraft 100 are computed using the average sine and cosine of the estimated attitude angles. The attitude angles are defined, but without limitation, as the vertical flight path, the horizontal flight path, and the bank angles. Because the aircraft 100 may be in a dynamic maneuver during this phase, the attitude angles may change between the beginning and end of the phase. The average accelerations are then used to explicitly define the flight path during the phase (instead of iteratively). The prediction computes the position, velocity, acceleration, and attitude of the aircraft at the end of the pilot response phase.

The second component is the roll response phase. This phase only applies to the vertical recovery trajectory 2100 because the oblique recovery trajectory 2200 assumes that the recovery will occur at the current bank angle. When the current bank angle at the end of the pilot response phase is greater than the angle of bank threshold to the left or right, the aircraft must first roll to wings level to ensure that the lift vector is indeed pointing away from the terrain. Lift vector is defined, but without limitation, as the direction of the total aerodynamic forces acting on an airfoil or an entire aircraft, perpendicular to the relative wind. The time required to roll to wings level (if required) is flight condition and aircraft dependent and is computed as part of the prediction. During this phase, the average accelerations acting on the aircraft are computed using the average sine and cosine of the bank angle (which is changing from its initial value to zero). The average accelerations are then used to explicitly define the flight path during the phase (instead of iteratively). As before, the prediction computes the position, velocity, acceleration and attitude of the aircraft at the end of the roll response phase.

The third component is the G-delay phase. This phase exists because of the non-minimum phase response of normal acceleration to longitudinal stick deflection. When the stick is pulled aft (toward the rear of an aircraft), the horizontal tail deflects leading-edge down causing the nose of the aircraft to eventually pitch up and the normal acceleration to increase. However, during about the first 0.5 seconds, or so, after the horizontal tail deflects, the total lift on the aircraft decreases because the horizontal tail is causing a larger downward (negative) lift. Once the aircraft begins increasing the angle of attack (any acute angle between two reference lines designating the cant, bank or angle of an airfoil relative to oncoming air), the total aircraft lift increases. The G-delay phase is the time until the normal acceleration reaches its initial value or the acceleration at which the aircraft was prior to pulling the stick aft. Again, the position, velocity, acceleration and attitude are predicted at the end of this phase.

The fourth phase is the G-onset phase. This is where the aircraft normal acceleration (nominally 1 g) increases to the targeted normal acceleration for recovery. The pilot has already applied aft stick to affect this increase in normal acceleration in the G-delay phase. This phase ends when the normal acceleration reaches the targeted normal acceleration. The targeted normal acceleration is flight condition and aircraft dependent and is computed at each frame. Above cornering speed, the targeted normal acceleration is 5 g (five times the gravitational force or pull of the earth) or 80% of the available normal acceleration, and below cornering speed, it is 80% of the available normal acceleration. During this phase, the average accelerations acting on the aircraft are computed using the average sine and cosine of the vertical flight path angle. The average accelerations are then used to explicitly define the flight path during the phase (instead of iteratively). The position, velocity, acceleration, and attitude are predicted for the end of this phase.

The fifth and final component of the recovery trajectories is the dive recovery phase. This is where the aircraft maintains the targeted normal acceleration until the recovery is complete. This trajectory component is modeled as an ellipse and allows for increases in airspeed (due to application of power, if required) and target normal acceleration (due to increased airspeed). The ellipse is modeled based upon the targeted normal acceleration and airspeed during the recovery. As the airspeed and target normal acceleration increase or decrease, the shape and length of the ellipse change to reflect the capabilities of the aircraft.

As stated earlier, to determine if the recovery trajectories intersect the digital terrain elevation data 50, the recovery trajectories are "sliced" into a number of segments. No slices are taken from the pilot response phase because, theoretically, the pilot would have insufficient time to recover the aircraft if the trajectories intersect the digital terrain during the pilot response phase. Slices are taken from the roll response, G-onset, and dive recovery phases. The predicted aircraft position (latitude, longitude, and altitude) is compared with the digital terrain elevation data 50 at each slice. When both recovery trajectories intersect the digital terrain for a number of consecutive slices, frames, or iterations the protection component 2000 sets the warning.

When digital terrain elevation data 50 is unavailable, the protection component 2000 computes the altitude required to recover, as stated above. However, the trajectories are not overlaid upon the digital terrain elevation data 50. Instead, the ending point for the recovery is computed as the targeted downward velocity. The targeted downward velocity is defined, but without limitation, as the downward velocity at which the aircraft becomes parallel with the terrain. For a landing condition, the targeted downward velocity is the landing gear structural limit. When the recovery achieves the targeted downward velocity, the recovery is complete. The altitude between the initial altitude and the altitude at which the targeted downward velocity is achieved is the altitude required to recover. When altitude required to recover is greater than or equal to the height above the terrain, as computed by the signal processing component 1000, for 4 consecutive slices, frames or iterations, the protection component 2000 sets the warning.

The embedded terrain awareness warning system for aircraft 1 may reside within an existing flight-worthy computer that contains the digital terrain elevation data 50 necessary for "look ahead" controlled flight into terrain protection. This system (and its related algorithm) is executable on any computer with access to the input data required and the digital terrain elevation data 50. Typically the system runs the entire algorithm at a speed of 10 times per second or 10 hertz. The preferred embodiment of the algorithm is listed in the computer program listing appendix.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. An embedded terrain awareness warning system for aircraft, the aircraft being flown by a pilot, the system comprising:
   (a) a signal processing component, the signal processing component being in communication with three-dimensional digital terrain elevation data, the three-dimensional digital terrain elevation data containing digital terrain, the signal processing component being able to take input data from aircraft sensors and determine aircraft velocity and aircraft position on the three-dimensional digital terrain elevation data;
   (b) a protection component, the protection component being in communication with the signal processing component such that the protection component being able to predict a flight path of the aircraft and overlay the flight path on the digital terrain elevation data and being able to determine if a potential controlled flight into terrain situation exists, the protection component further being able to determine a recovery flight path to avoid terrain; and
   (c) a pilot vehicle interface, the pilot vehicle interface communicating with the protection component such that the pilot vehicle interface can issue to the pilot of the aircraft a warning if there exists a potential impending flight into terrain, and issue to the pilot directions for a recovery flight path solution to prevent flight into terrain, the directions for a recovery flight path solution being based on the recovery flight path to avoid terrain.

2. The embedded terrain awareness warning system for aircraft of claim 1, wherein the pilot vehicle interface issues a visual and an aural warning to the pilot indicating direction and maneuver for recovery.

3. The embedded terrain awareness warning system for aircraft of claim 2, wherein the protection component predicts two flight paths, the two flight paths being a vertical recovery trajectory and an oblique recovery trajectory, the protection component setting a warning if both the vertical recovery trajectory and the oblique recovery trajectory intersect digital terrain, the warning being issued to the pilot by the pilot vehicle interface.

4. The embedded terrain awareness warning system for aircraft of claim 3, wherein the flight paths are broken down into five components, the five components include a pilot response phase, a roll response phase, a G-delay phase, a G-onset phase and a dive recovery phase.

5. The embedded terrain awareness warning system for aircraft of claim 4, wherein the warning to the pilot is issued only when both the vertical recovery trajectory and the oblique recovery trajectory intersect digital terrain for four consecutive iterations.

6. The embedded terrain awareness warning system for aircraft of claim 5, wherein the warning is cleared when either of the recovery trajectories no longer intersect the digital terrain for four consecutive iterations.

7. An embedded terrain awareness warning system for aircraft, the aircraft being flown by a pilot, the system comprising:
   (a) a signal processing component, the signal processing component communicating with three-dimensional digital terrain elevation data, the three-dimensional digital terrain elevation data containing digital terrain, the signal processing component being able to take input data from aircraft sensors and determine aircraft velocity and aircraft position on the three-dimensional digital terrain elevation data;
   (b) a protection component, the protection component being in communication with the signal processing component such that the protection component being able to predict flight paths of the aircraft and overlay the flight paths on the digital terrain elevation data and the protection component being able to determine if a potential controlled flight into terrain exists, the protection component further being able to determine a recovery flight path to avoid terrain, the protection component being able to predict two flight paths, the two flight paths being a vertical recovery trajectory and an oblique recovery trajectory, the vertical recovery trajectory being broken down into five components, the five components include a pilot response phase, a roll response phase, a G-delay phase, a G-onset phase and a dive recovery phase, the oblique recovery trajectory being broken down into four components, the four components include a pilot response phase, a G-delay phase, a G-onset phase and a dive recovery phase; and (c) a pilot vehicle interface, the pilot vehicle interface communicating with the protection component such that the pilot vehicle interface being able to issue to the pilot of the aircraft a warning of impending flight into terrain, the warning is issued only when both the vertical recovery trajectory and oblique recovery trajectory intersect digital terrain on the three dimensional digital terrain elevation data for four consecutive iterations, the pilot vehicle interface also being able to issue to the pilot a flight path solution to prevent the impending flight into terrain, the flight path solution being based on the recovery flight path, the flight path solution and the warning may be visual and aural.

8. The embedded terrain awareness warning system for aircraft of claim 7, wherein the flight paths are computed based upon average accelerations using the average sines and cosines of attitude angles of the aircraft.

9. The embedded terrain awareness warning system for aircraft of claim 8, wherein the flight paths are sliced into numerous segments which are compared against the digital terrain elevation data for intersection.

10. The embedded terrain awareness warning system for aircraft of claim 9, wherein when the vertical recovery trajectory intersects the digital terrain, terrain on either side of, and perpendicular to the vertical recovery trajectory, the vertical recovery trajectory at the potential intersection point is checked for trajectory intercept.

11. The embedded terrain awareness warning system for aircraft of claim 10, wherein the warning is cleared when either of the recovery trajectories no longer intersect the digital terrain for four consecutive iterations.

12. The embedded terrain awareness warning system for aircraft of claim 11, wherein the three dimensional digital terrain elevation data is stored in a digital terrain elevation database.

13. The embedded terrain awareness warning system for aircraft of claim 12, wherein the digital terrain elevation database is contained in the signal processing component.

14. The embedded terrain awareness warning system for aircraft of claim 13, wherein the visual warning is displayed on a head-up display of the aircraft.

15. The embedded terrain awareness warning system for aircraft of claim 14, wherein the aural warnings are directive and convey the sense of urgency required by the situation.

16. A method for providing an embedded terrain awareness warning system to aircraft, the aircraft being flown by a pilot, the method comprising:

(a) providing three-dimensional digital terrain elevation data;

(b) providing a signal processing component, the signal processing component being able to take input data from aircraft sensors and the three-dimensional digital terrain elevation data, the signal processing component also being able to determine aircraft velocity and position on the three-dimensional digital terrain elevation data;

(c) providing a protection component, the protection component being in communication with the signal processing component such that the protection component being able to predict flight paths of the aircraft and overlay the flight paths on the digital terrain elevation data and being able to determine if a potential controlled flight into terrain situation exists, the protection component being able determine a recovery flight path to avoid terrain; and (d) providing a pilot vehicle interface, the pilot vehicle interface communicating with the protection component such that the pilot vehicle interface can issue to the pilot of the aircraft a warning if there exists a potential impending flight into terrain, and issue to the pilot directions for a recovery flight path solution to prevent flight into terrain, the recovery flight path solution being based on the recovery flight path to avoid terrain.

17. The method of claim 16, wherein the pilot vehicle interface provides a visual and aural warning to the pilot indicating the direction and maneuver for recovery.

18. The method of claim 17, wherein the protection component being able to predict two flight paths, a vertical recovery trajectory and an oblique recovery trajectory, the vertical recovery trajectory being broken down into five components, the five components include a pilot response phase, a roll response phase, a G-delay phase, a G-onset phase and a dive recovery phase, the oblique recovery trajectory being broken down into four components, the four components include a pilot response phase, a G-delay phase, a G-onset phase and a dive recovery phase.

19. The method of claim 18, wherein the warning is issued only when both the vertical recovery trajectory and oblique recovery trajectory intersect digital terrain on the three dimensional digital terrain elevation data for four consecutive iterations, the pilot vehicle interface also being able to issue to the pilot a flight path solution to prevent the impending flight into terrain, the flight path solution being based on the recovery flight path, the flight path solution and the warning may be visual and aural.

20. An embedded terrain awareness warning system for aircraft, the aircraft being flown by a pilot, the system comprising:

(a) a signal processing component, the signal processing component being in communication with three-dimensional digital terrain elevation data, the three-dimensional digital terrain elevation data containing digital terrain, the signal processing component having a determination means for taking input data from aircraft sensors and determining aircraft velocity and aircraft position on the three-dimensional digital terrain elevation data;

(b) a protection component, the protection component being in communication with the signal processing component, the protection component having a prediction means for predicting a flight path of the aircraft and overlaying the flight path on the digital terrain elevation data and determining if a potential controlled flight into terrain situation exists, the protection component further having a recovery flight path determination means for determining a recovery flight path to avoid terrain; and (c) a pilot vehicle interface, the pilot vehicle interface communicating with the protection component, the pilot vehicle interface having an issuance means for issuing to the pilot of the aircraft a warning if there exists a potential impending flight into terrain, and issuing to the pilot directions for a recovery flight path solution to prevent flight into terrain, the directions for a recovery flight path solution being based on the recovery flight path to avoid terrain.

21. A computer software system aboard an aircraft being flown by a pilot, the system having a set of instructions for controlling a general purpose digital computer in performing a desired function, the functions comprising:

(a) taking input data from aircraft sensors and three-dimensional digital terrain elevation data and determining aircraft velocity and position on the three-dimensional digital terrain elevation data;

(b) predicting flight paths of the aircraft and overlaying the flight paths on the digital terrain elevation data and determining if a potential controlled flight into terrain situation exists;

(c) determining a recovery flight path to avoid terrain;

(d) issuing to the pilot of the aircraft a warning if there exists a potential impending flight into terrain; and (e) issuing to the pilot directions for a recovery flight path solution to prevent flight into terrain, the recovery flight path solution being based on the recovery flight path to avoid terrain.

* * * * *